(12) United States Patent
Whitby-Strevens et al.

(10) Patent No.: US 10,466,757 B2
(45) Date of Patent: Nov. 5, 2019

(54) METHODS AND APPARATUS FOR SAFE NEGOTIATION OF HIGH CURRENT FOR ACTIVE CABLE ASSEMBLIES

(71) Applicant: Apple Inc., Cupertino, CA (US)

(72) Inventors: Colin Whitby-Strevens, Cupertino, CA (US); Bob Ridenour, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 159 days.

(21) Appl. No.: 15/720,466

(22) Filed: Sep. 29, 2017

(65) Prior Publication Data

US 2019/0018465 A1 Jan. 17, 2019

Related U.S. Application Data

(60) Provisional application No. 62/531,726, filed on Jul. 12, 2017.

(51) Int. Cl.
| | |
|---|---|
| G06F 1/26 | (2006.01) |
| G06F 1/3215 | (2019.01) |
| G06F 1/3206 | (2019.01) |
| G06F 1/3218 | (2019.01) |

(52) U.S. Cl.
CPC .......... *G06F 1/266* (2013.01); *G06F 1/3215* (2013.01); *G06F 1/3206* (2013.01); *G06F 1/3218* (2013.01)

(58) Field of Classification Search
CPC ...... G06F 1/266; G06F 1/3206; G06F 1/3215; G06F 1/3218
See application file for complete search history.

(56) References Cited

U.S. PATENT DOCUMENTS

| | | | | |
|---|---|---|---|---|
| 2012/0012358 | A1* | 1/2012 | Horan | H04L 25/0272 174/113 R |
| 2012/0064758 | A1* | 3/2012 | Grice | H01R 13/641 439/490 |
| 2014/0327833 | A1* | 11/2014 | Kabuto | G06F 1/266 348/730 |
| 2015/0212497 | A1* | 7/2015 | Dunstan | G06F 1/26 307/130 |
| 2018/0131142 | A1* | 5/2018 | Satheesh | H01R 13/6691 |

* cited by examiner

*Primary Examiner* — Glenn A. Auve
(74) *Attorney, Agent, or Firm* — Gazdzinski & Associates, PC (57) ABSTRACT

Methods and apparatus for the safe negotiation of high current for a High-Definition Multimedia Interface (HDMI) active cable assembly. In one embodiment, a method for detecting a Power for Cable Assembly (PCA)-capable source is disclosed, the method including: detecting, by a cable assembly, an assertion of a defined voltage on a power supply pin; forwarding an assertion of a hot plug detect signal pin, by the cable assembly, from a sink device towards the PCA-capable source; detecting, by the cable assembly, a reduction in the defined voltage on the power supply pin for a defined period of time in response to the forwarding; and detecting, by the cable assembly, a re-assertion of the defined voltage on the power supply pin subsequent to the lapse of the defined period of time. PCA dependent cable assemblies and PCA capable source devices are also disclosed.

20 Claims, 6 Drawing Sheets

METHODS AND APPARATUS FOR SAFE NEGOTIATION OF HIGH CURRENT FOR ACTIVE CABLE ASSEMBLIES

PRIORITY

This application claims the benefit of priority to U.S. Provisional Patent Application Ser. No. 62/531,726 filed Jul. 12, 2017 and entitled "Methods and Apparatus for Safe Negotiation of High Current for HDMI Active Cable Assemblies", the contents of which being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of audio/visual (AN) consumer electronics devices. More particularly, and in one exemplary aspect, the disclosure is directed to power for cable assembly for use in HDMI systems along with their methods of operation and use.

2. Description of Related Technology

HDMI (High-Definition Multimedia Interface) (see, inter alia, www.hdmi.org) is an exemplary dominant digital audio/video interface technology specified by the HDMI Founders. Current incarnations of the standard specify support for simple networking of digital audio/visual (A/V) interconnects that are intended to be used primarily between an arbitrary assembly of multimedia "sources" (e.g., set-top boxes, DVD players, Blu-ray Disc players, video game consoles, computers or CPUs) and "sinks" (e.g., display monitors, home-theater systems, etc.). This interconnection is generally unidirectional in nature; i.e., from source to sink, in current implementations.

Figure 1:
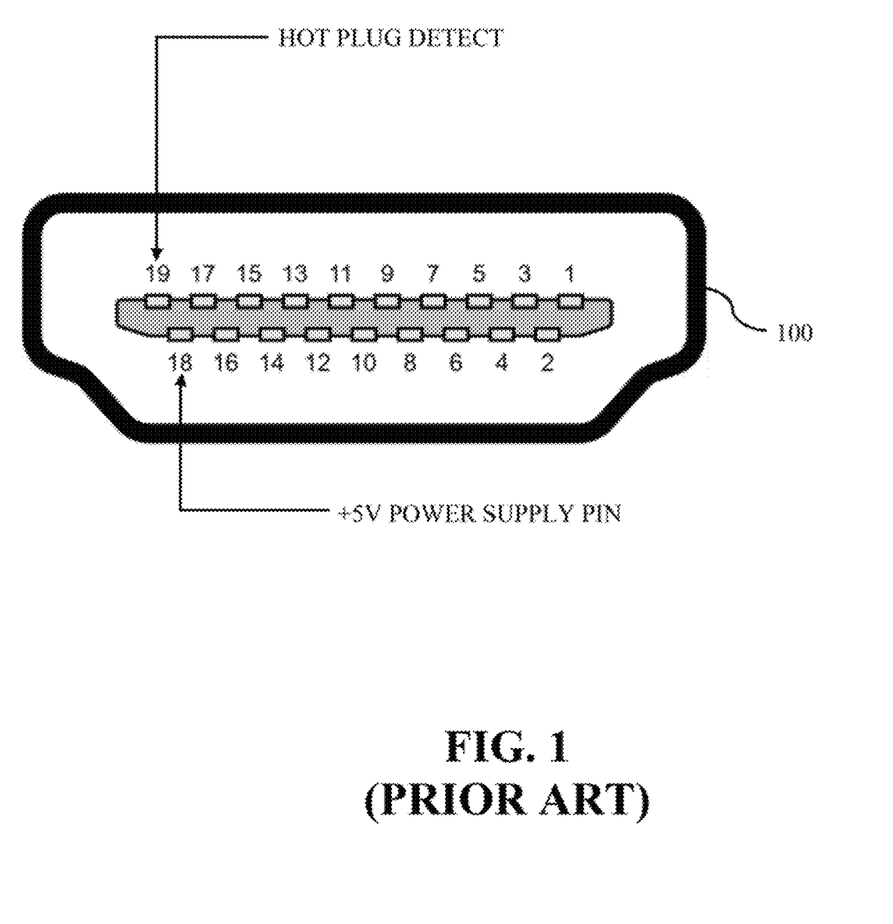
FIG. 1 is a graphical illustration depicting a prior art pin layout for an HDMI type A interface useful in discussing the principles of the present disclosure.

Referring now to FIG. 1, an HDMI type A receptacle 100 specifies the operation of nineteen separate signaling pins. For example, the first nine pins (i.e., pins 1-9) on an HDMI interface specify three main Transmission-Minimized Differential Signaling (TMDS) channels, with each of these TMDS channels including three pins or lines for positive values, negative values and a ground or data shield, respectively. HDMI pins ten through twelve carry data for the TMDS clock channel. The TMDS clock channel helps keep the signals transmitted over the three main TMDS channels in synchronization. As with the TMDS main channels, the TMDS clock channel includes three separate lines for positive values, negative values and a ground or data shield channel. Pin thirteen carries the Consumer Electronics Control (CEC) channel, which is utilized for sending command and control data between connected devices (e.g., between a source and a sink). Pin fourteen is now a Utility pin as of HDMI 1.4b and is used to implement an HDMI Ethernet and Audio Return Channel, while pins fifteen and sixteen are dedicated to the Display Data Channel (DDC), which is used for communicating, for example, Extended Display Identification Data (EDID) information between devices. Pin seventeen is a data shield for the CEC and DDC channels. Pin eighteen carries a low-voltage (+5V) power supply, while pin nineteen is the Hot Plug Detect (HPD), which is dedicated to monitoring power up/down and plug/unplug events.

As previously alluded to, HDMI Sources provide +5V of power on the low-voltage power supply pin (e.g., pin eighteen). Currently, HDMI Sources are required to support 55 mA of current at this specified +5V voltage. 50 mA of this current is passed on to the sink in order to enable the sink to draw this much current, leaving 5 mA of current for the cable assembly itself to consume. Accordingly, extant HDMI cable assemblies are passive in nature and do not include any logic for the purpose of signal conditioning or for the purpose of repeating signals (e.g., for so-called repeaters). Moreover, current incarnations of HDMI have electrical requirements that limit the achievable maximum cable length of passive HDMI cable assemblies. Achievable maximum passive cable lengths are expected to decrease as data throughput increases (e.g., as data speeds increase) in future unspecified versions of HDMI. However, many common HDMI implementations often require cable lengths of greater than the maximum achievable passive cable length for the purposes of convenience for users of these HDMI systems (e.g., source coupled to a sink through a cable assembly). For example, in many common A/V systems, the cable length between an HDMI source and an HDMI sink may typically be longer than the maximum achievable passive cable length.

One proposed solution for these cable length limitations of passive HDMI cable assemblies is through the use of a so-called Power for Cable Assembly (PCA) feature, whereby PCA capable sources are required to support the transmission of higher currents over the +5V power supply pin (pin 18). Active cable assemblies may require significantly more current (e.g., 250 mA) for the purpose of powering the active cable assembly's internal logic (e.g., signal conditioning circuitry, repeaters, etc.). Accordingly, PCA capable sources may be required to support up to 300 mA of current, where 250 mA of current is utilized by the internal logic for the active cable assembly and 50 mA of current is supplied to the sink. However, over 4 billion HDMI devices have been sold worldwide that are specifically configured to handle legacy (e.g., 55 mA) currents over this +5V power supply pin.

Accordingly, if an active cable assembly is connected to a non-PCA capable source device, there is a significant risk that this active cable assembly will trip the source's over-current protection fuse (OCP). Although OCP fuses are resettable, it is believed that triggering the OCP fuse on non-PCA capable source devices may cause these OCP fuses to rapidly deteriorate and/or fail entirely. Therefore, methods and apparatus are needed by which an active cable assembly may distinguish between a PCA capable source and a non-PCA capable source in order to prevent, inter alia, the over drawing of current which may trigger these OCP fuses on non-PCA capable source devices. Moreover, as HDMI communication links are for the most part unidirectional in nature, the ability for these PCA cable assemblies to coordinate PCA operation with their accompanying source devices are further complicated.

SUMMARY

The present disclosure satisfies the aforementioned needs by providing, inter alia, improved apparatus and methods for distinguishing between PCA capable source devices and non-PCA capable source devices.

In one aspect, a source device is disclosed. In one embodiment, the source device includes a PCA capable source device that includes a network interface, the network interface including a plurality of data transmission lanes, a hot plug detect signaling pin, and a power supply pin; a processor apparatus; and a non-transitory computer readable apparatus, the non-transitory computer readable apparatus including a storage medium, the storage medium having computer-executable instructions, the computer-executable instructions, when executed by a processor apparatus, are configured to: assert a defined voltage on the power supply pin; receive an assertion of a hot plug detect signal via the hot plug detect signaling pin; assert a reduced voltage on the power supply pin, the reduced voltage being less than the defined voltage, the reduced voltage being asserted for a defined period of time in response to the received hot plug detect signal; and re-assert the defined voltage on the power supply pin subsequent to the lapse of the defined period of time.

In one variant, the PCA capable source device is configured to operate according to two operating paradigms, the two operating paradigms including a PCA enabled source operating paradigm and a PCA disabled source operating paradigm.

In another variant, the assertion of the reduced voltage on the power supply pin is indicative of the PCA enabled source operating paradigm.

In yet another variant, the assertion of the defined voltage on the power supply pin is indicative of either the PCA enabled source operating paradigm or the PCA disabled source operating paradigm.

In yet another variant, the computer-executable instructions, when executed by the processor apparatus, are further configured to: enable an increased current draw over the power supply pin when in the PCA enabled source operating paradigm, the increased current draw being enabled without triggering a fuse present on the PCA capable source device, the increased current draw being higher in current than a current draw when the PCA capable source device is operating in accordance with the PCA disabled source operating paradigm.

In yet another variant, the received assertion of the hot plug detect signal is received in response to the assertion of the defined voltage on the power supply pin.

In yet another variant, the PCA capable source device further includes a timer, the timer configured to establish the defined period of time.

In a second aspect, a cable assembly is disclosed. In one embodiment, the cable assembly includes a PCA dependent cable assembly that further includes a first network interface that is configured to be coupled with a source device; a second network interface that is configured to be coupled with a sink device; and internal logic that is configured to enable the PCA dependent cable assembly to: detect an assertion of a defined voltage on a power supply pin associated with the first network interface; forward an assertion of a hot plug detect signal pin received by the second network interface over the first network interface towards the source device; detect a reduction in the defined voltage on the power supply pin associated with the first network interface for a defined period of time in response to the forward of the assertion of the hot plug detect signal; and detect a re-assertion of the defined voltage on the power supply pin associated with the first network interface, subsequent to the lapse of the defined period of time.

In one variant, the internal logic further includes one or more integrated circuits, the one or more integrated circuits further configured to enable a signal conditioning function for data transmitted over the first network interface.

In another variant, the internal logic further includes one or more integrated circuits, the one or more integrated circuits further configured to enable a repeater function for data transmitted over the first network interface.

In yet another variant, the cable assembly includes self-powering circuitry, the self-powering circuitry enabling power of the internal logic by means other than the power supply pin associated with the first network interface.

In yet another variant, the internal logic configured to forward the assertion of the hot plug detect signal pin is further configured to forward the assertion of the hot plug detect signal pin in response to the detection of the assertion of the defined voltage on the power supply pin.

In yet another variant, the internal logic is further configured to increase a current draw from the source device subsequent to the detection of the re-assertion of the defined voltage on the power supply pin associated with the first network interface.

In yet another variant, the internal logic further includes a comparator; other portions of the internal logic are configured to utilize an output of the comparator for the detection of the reduction in the defined voltage on the power supply pin associated with the first network interface.

In yet another variant, the internal logic further includes a timer, the timer being utilized in order to evaluate the defined period of time.

In a third aspect, a sink device is disclosed. In one embodiment, the sink device is configured to be coupled with the aforementioned source devices via the aforementioned cable assemblies.

In a fourth aspect, an A/V communication system is disclosed. In one embodiment, the A/V communication system includes the aforementioned sink device, the aforementioned source device and the aforementioned cable assembly.

In a fifth aspect, methods associated with the aforementioned source device, cable assembly, sink device, and/or A/V communication system are disclosed. In one embodiment, a method for detecting a Power for Cable Assembly (PCA)-capable source is described. The method includes detecting, by a cable assembly, an assertion of a defined voltage on a power supply pin; forwarding an assertion of a hot plug detect signal pin, by the cable assembly, from a sink device towards the PCA-capable source; detecting, by the cable assembly, a reduction in the defined voltage on the power supply pin for a defined period of time in response to the forwarding; and detecting, by the cable assembly, a re-assertion of the defined voltage on the power supply pin subsequent to the lapse of the defined period of time.

In one variant, the forwarding of the assertion of the hot plug detect signal pin is in response to the detecting, by the cable assembly, of the assertion of the defined voltage on the power supply pin.

In another variant, the method further includes increasing a current draw, by the cable assembly, from the PCA-capable source subsequent to the detecting, by the cable assembly, of the re-assertion of the defined voltage on the power supply pin.

In yet another variant, the method further includes utilizing an output of a comparator for the detecting, by the cable assembly, of the reduction in the defined voltage on the power supply pin.

In yet another variant, the method further includes using a timer in order to evaluate the defined period of time in response to the forwarding.

In a sixth aspect, a computer readable apparatus is disclosed. In one embodiment, the computer readable apparatus includes instructions, that when executed by a processor apparatus are configured to: assert a defined voltage on a power supply pin; receive an assertion of a hot plug detect signal via the hot plug detect signaling pin; assert a reduced voltage on the power supply pin, the reduced voltage being less than the defined voltage, the reduced voltage being asserted for a defined period of time in response to the received hot plug detect signal; and re-assert the defined voltage on the power supply pin subsequent to the lapse of the defined period of time.

In a seventh aspect, hardware logic is disclosed. In one embodiment, the hardware logic is configured to: detect an assertion of a defined voltage on a power supply pin; forward an assertion of a hot plug detect signal pin from a sink device towards the PCA-capable source; detection of a reduction in the defined voltage on the power supply pin for a defined period of time in response to the forwarding of the assertion of the hot plug detect signal; and detection of a re-assertion of the defined voltage on the power supply pin subsequent to the lapse of the defined period of time.

Other features and advantages of the present disclosure will immediately be recognized by persons of ordinary skill in the art with reference to the attached drawings and detailed description of exemplary embodiments as given below.

All Figures disclosed herein are © Copyright 2017 Apple Inc. All rights reserved.

DETAILED DESCRIPTION

Reference is now made to the drawings, wherein like numbers refer to like or similar parts throughout.

Detailed Description of Exemplary Embodiments

It will be recognized that while the following discussion is cast primarily in terms of PCA cable assemblies for use in HDMI systems, the principles of the present disclosure are not so limited. It would be readily apparent to one of ordinary skill that the same (or similar) principles may apply to alternative A/V systems. For example, the principles of the present disclosure may be applied in situations in which a cable assembly needs to identify and differentiate between differing content-providing devices without having the ability to negotiate or communicate information directly to these content-providing devices.

Exemplary Apparatus—

Figure 2:
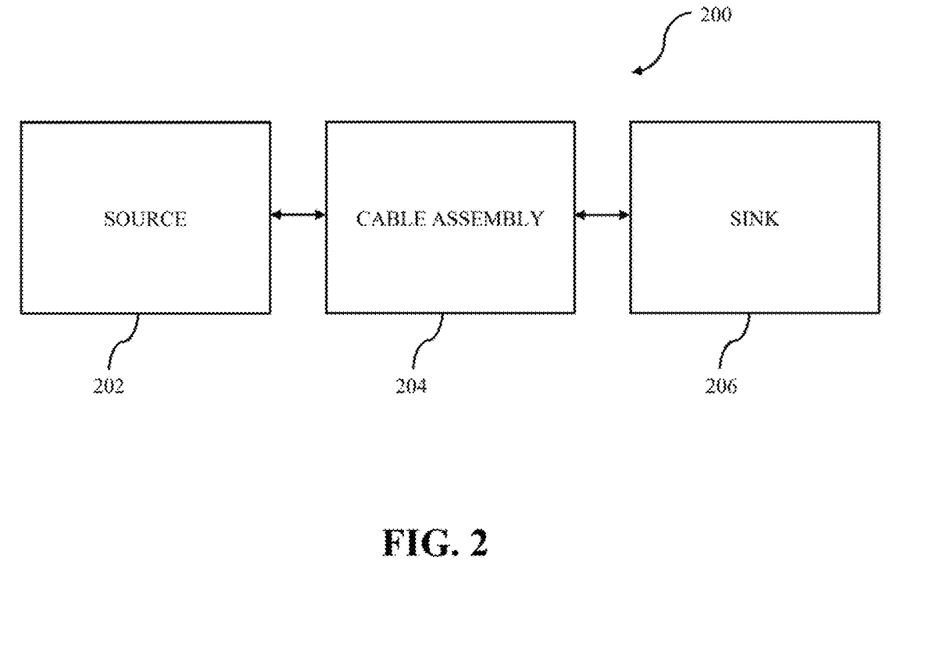
FIG. 2 is a block diagram of one embodiment of an HDMI system, useful for describing the various principles described herein in accordance with the principles of the present disclosure.

Referring now to FIG. 2, an exemplary HDMI system 200 is shown and described in detail. The exemplary HDMI system 200 illustrated is composed of a source device 202, a cable assembly 204, and a sink device 206. The source device 202 is electrically coupled with the sink device via respective network interfaces (e.g., HDMI ports) and the cable assembly 204. The source device 202 further includes internal logic which enables the functionality of the source device. The source device 202 may consist of either a PCA capable source device, or a legacy non-PCA capable source device. In some implementations, in which a PCA capable source device is present, the PCA capable source may operate according to two distinct operating paradigms such as: (1) a PCA enabled source for which the PCA feature described subsequently herein has been enabled; and (2) a PCA disabled source for which the PCA feature has not been enabled or otherwise has been disabled. For example, when a PCA capable source is operating from a fixed power source (e.g., a wall alternating current (AC) outlet), it may operate according to the PCA enabled operating paradigm. However, if the PCA capable source is operating based on, for example, an internal battery, it may operate under the PCA disabled operating paradigm. The decision about whether to operate according to one of the two operating paradigms may be chosen based on power consumption considerations, or may instead (or in addition to) be chosen based on latency considerations such as HDMI source/sink connection times.

In some implementations, the PCA capable source device may only operate according to a single paradigm in which the source device operates with the PCA feature always enabled. The PCA capable source may also be configured to advertise its PCA capability to a PCA cable assembly. For example, the PCA capable source 202 may advertise its PCA capability (e.g., when operating in the PCA enabled paradigm) upon (or after) detection of, for example, HPD signal operating at a high voltage in some implementations. In some implementations, the PCA capable source 202 may advertise its PCA capability upon (or after) detection of a low voltage for a given period of time. The PCA enabled source may also support a minimum level of current draw in some implementations (e.g., 300 mA). The PCA enabled source may also be required to advertise its PCA capability prior to initiating transmissions on its high speed link (e.g., with TMDS or other high speed signaling technologies as defined by future HDMI specifications).

In some implementations, the PCA capable source device 202 may include multiple ports (i.e., multiple HDMI ports) for which one or more of these ports may have the PCA functionality enabled. Accordingly, each of the multiple ports, or at least a portion thereof that are capable of operating according to the PCA enabled paradigm, may be capable of providing PCA functionality over each of its +5V power pins. For example, every port of a multi-port PCA capable source device may require PCA functionality dependent upon whether or not a given PCA cable assembly 204 is attached thereto. A PCA source device 202 may also enable its support for PCA functionality and operate as a PCA enabled source before it detects HPD at a high voltage upon first connection. Additionally, a PCA capable source may force a logical disconnect before changing its support from enabled to disabled (or disabled to enabled) by applying a signaling voltage for a minimum of a predetermined period of time.

Figure 6:
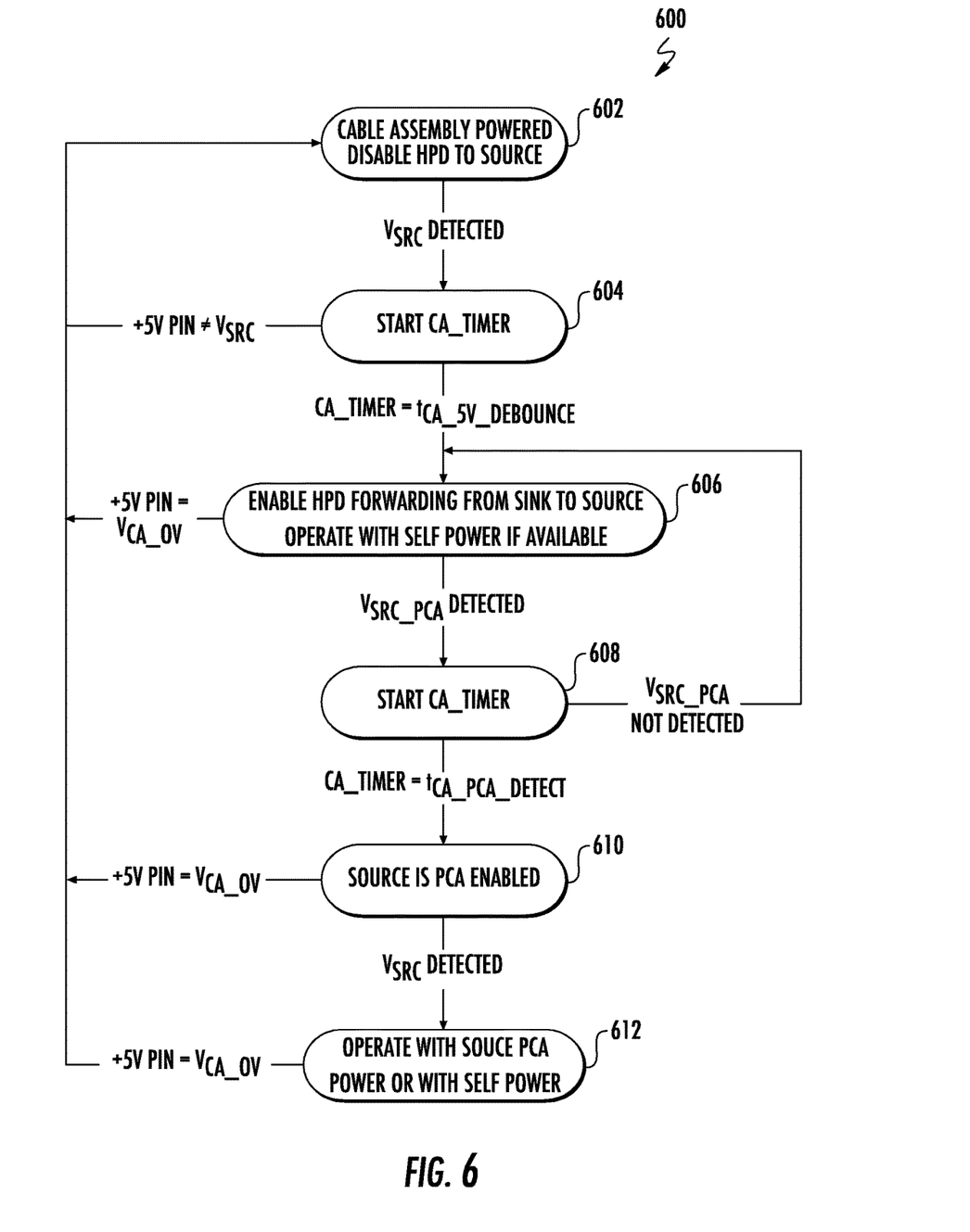
FIG. 6 is an exemplary state machine for a PCA enabled cable assembly in accordance with the principles of the present disclosure.

The cable assembly 204 may also consist of a PCA dependent cable assembly with internal logic for which the PCA cable assembly may require the drawing of additional current from the PCA enabled source 202 in order to power its internal logic. The cable assembly 204 may start operation prior to receiving the PCA advertisement from the source 202 (for example, if the cable assembly 204 is self-powered as described infra); however, the cable assembly 204 may be restricted in terms of its consumption of power/current over the +5V signaling line (e.g., may not draw current in excess of $I_{SRC}$ referenced infra), until this advertisement has been received in some implementations. The internal logic of the cable assembly 204 may include, for example, signal conditioning functionality in order to "clean up" the data traveling over, for example, the TMDS lanes. Additionally, this internal logic may include repeater functionality in which at least a portion of the data received from the source device 202 may be passed along to the sink device 206 in order to overcome, for example, the aforementioned limitations associated with legacy HDMI cable length requirements, in addition to (or alternatively than) the aforementioned signal conditioning functionality. The cable assembly 204 may also include internal logic (e.g., one or more integrated circuits (IC)) that enables the cable assembly to detect and modify its current draw from a source device 202. For example, the cable assembly 204 may include internal logic in order to operate in accordance with the state machine as shown in FIG. 6.

In addition to (or alternatively than), receiving power over the +5V pin, the PCA cable assembly may also be self-powered. In other words, the PCA cable assembly may be powered via a power source other than the +5V pin (e.g., powered from an external AC adapter, from a Universal Serial Bus (USB) connection, internal batteries, and other suitable power sources other than the +5V pin). For example, a given PCA cable assembly may include, for example, a USB Micro-B or USB Type-C receptacle and accordingly, such a PCA cable assembly may not include any additional power cables or power supplies. As but yet another example, a PCA cable assembly may include an external power input connector that is not, for example, a USB Micro-B or USB Type-C receptacle. Accordingly, this PCA cable assembly may include a cable that plugs into an external power input connector on the cable assembly and may have a USB Std-A or USB Type-C plug at the other end of the cable to provide this power to the cable assembly. However, in some implementations, it may be desirable to rely solely upon the +5V pin. For example, consumers may prefer a less bulky PCA cable assembly, may prefer a reduced number of cables, and/or may prefer to use these PCA dependent cable assemblies without requiring that these cable assemblies be self-powered.

The aforementioned internal logic present in both the source device 202 and the cable assembly 204 may include either hardware or software, or combinations of the foregoing hardware and software. Hardware implementations may be characterized by, for example, one or more integrated circuits that are configured to implement one or more of the functionalities described herein. For example, hardware implementations may enable the functionality described with respect to, for example, FIG. 3. Software implementations may be characterized by a non-transitory computer readable apparatus having a storage medium, the storage medium including computer-executable instructions (e.g., a computer program) that when executed by a processing apparatus are configured to implement one or more of the functionalities described herein. For example, software implementations may enable the functionality described with respect to, for example, FIG. 3. Combinations of the foregoing hardware and software are also envisioned with respect to, for example, the HDMI system 200 shown in FIG. 2 and which enable the implementation of one or more of the functionalities described herein.

The aforementioned source devices 202 may include, for example, DVD players, Blu-Ray players, so-called High-Definition (HD) players, cable or satellite set-top boxes, computing devices (e.g., desktop devices, laptop devices, tablet computers, etc.), smart phones and smart watches and/or other types of devices capable of providing A/V content. Conversely, the sink device 206 may include any type of device capable of consuming (e.g., for the purpose of display) the aforementioned A/V content. Examples of exemplary sink devices include, without limitation, television displays, computer monitors or computer displays, smartphone displays, and other types of display devices as would be appreciated by one of ordinary skill given the contents of the present disclosure. In accordance with the principles of the present disclosure, exemplary methodologies are now described in which a PCA cable assembly may determine whether or not it is connected with a PCA capable (or enabled) source device.

Methods—

Figure 3:
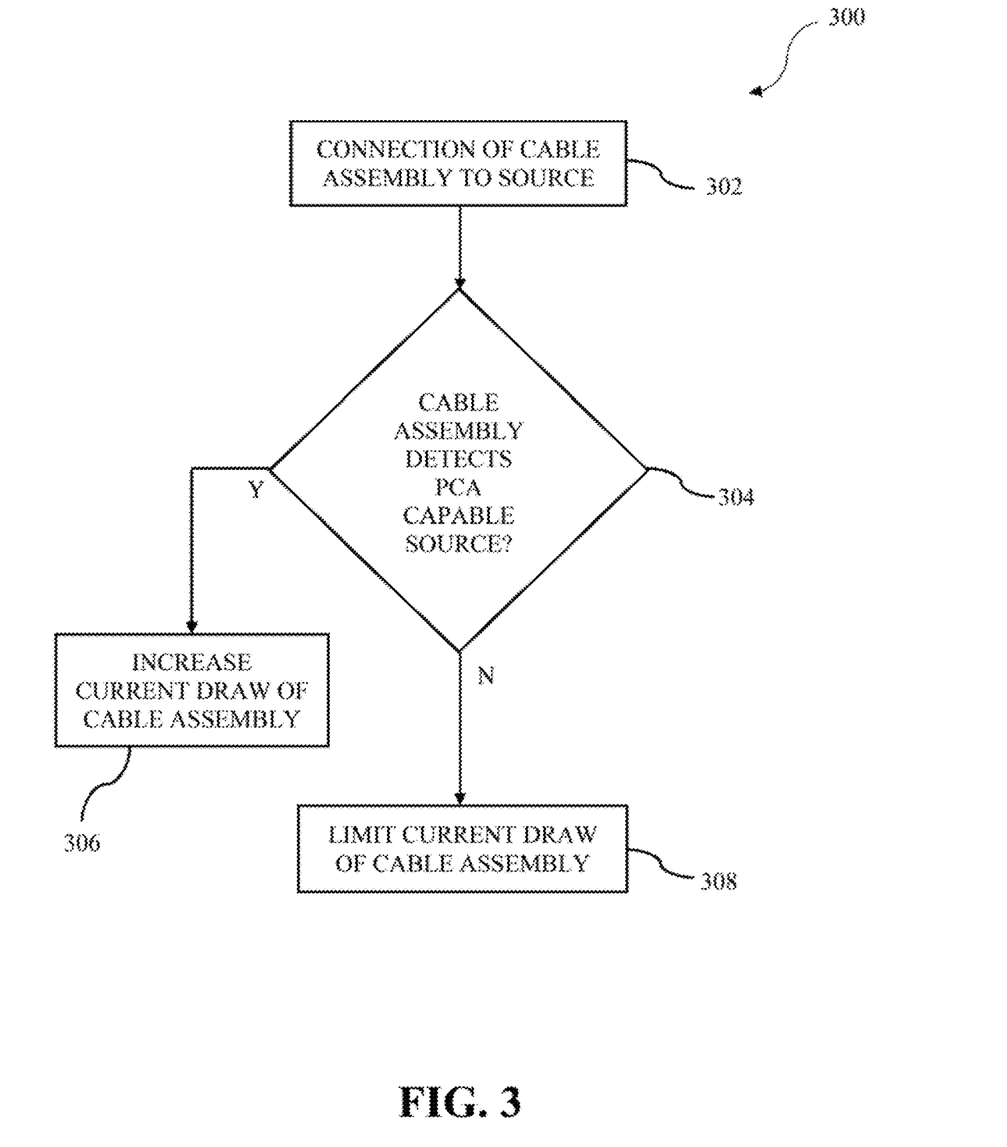
FIG. 3 is a logical flow diagram of a generalized methodology for detecting and modifying the current draw from a source device by a PCA cable assembly in accordance with the principles of the present disclosure.

Referring now to FIG. 3, a generalized method 300 for detecting and modifying the current draw from a source device by a PCA cable assembly is shown and described in detail. As previously alluded to, legacy A/V systems with passive transmission cables, such as the aforementioned legacy HDMI systems, may only support smaller amounts of current (e.g., 55 mA). However, active cable assemblies (such as the aforementioned HDMI PCA cable assembly) may require additional current (e.g., 300 mA or more) from their respective source devices, especially in instances in which they are otherwise not externally powered. However, attempts at drawing this additional current from legacy HDMI source devices may have deleterious effects on, for example, legacy HDMI source device over-current protection circuitry.

At operation 302, a cable assembly is connected with a source device. In some implementations, this connection of the cable assembly with the source device involves the insertion of a plug (male) connector into a receptacle (female) connector. This plug (male) connector may be associated with the PCA cable assembly in some implementations, while the receptacle (female) connector may be associated with the source device. Alternatively, the plug/receptacle may be reversed, such that the plug (male) connector may be associated with the source device, while the receptacle (female) connector may be associated with the PCA cable assembly. In the exemplary context of HDMI, these plug/receptacle connector combinations may include one of the following types of connectors including: Type A, Type B, Type C, Type D, or Type E.

At operation 304, the cable assembly detects whether the source device to which the cable assembly is connected is a PCA capable (or PCA enabled) source. In some implementations, the cable assembly may be further configured to detect whether the PCA capable source is operating according to the PCA enabled operating paradigm. At operation 306, if the cable assembly detects that it is connected to a PCA capable (or PCA enabled) source, the cable assembly may be able to increase its current draw from the PCA capable (or PCA enabled) source. At operation 308, if the cable assembly detects that it is not connected to a PCA capable (or PCA enabled) source, the cable assembly will limit its current draw in order to, for example, avoid "tripping" the over-current protection circuitry (e.g., an OCP fuse) contained within the source device. In such a scenario, the PCA cable assembly may require an external power source (i.e., a power source other than the +5V pin).

Example Operation No. 1

Upon connection of a cable assembly to a source device at operation 302, a PCA enabled source may start out by setting a reduced voltage on the +5V signaling line (e.g., 3.3V) for a defined period of time (e.g., 500 msec). After this defined period of time, the PCA enabled source may then increase this voltage to +5V. If an active cable assembly detects this reduced voltage on the signaling line at operation 304 (e.g., for the defined period of time) it may then recognize the source as a PCA enabled source and therefore may increase its current draw in order to, for example, power its active logic at operation 306. The active cable assembly may decide to increase its current draw during the reduced voltage period, or may wait until the voltage has been increased to, for example, +5V from the reduced voltage level. However, if the active cable assembly doesn't see this reduced voltage on the power supply pin, the active cable assembly may limit its current draw (e.g., to 5 mA) so as to comply with legacy aspects of the HDMI standard at operation 308. Additionally, connected sink devices may typically not operate until +5V is applied to the power supply pin and hence operation of the sink device may be delayed during this defined period of time (e.g., 500 msec). In particular, the connection of a passive HDMI cable to a PCA enabled source may experience additional latencies. However, this introduced latency may be significantly shorter than extant latencies and hence, may produce no perceived decline in user experience through the introduction of, for example, this reduced voltage for this defined period of time.

Example Operation No. 2

Upon connection of a cable assembly to a source device at operation 302, a PCA enabled source may wait for an event to occur prior to setting a reduced voltage on the +5V signaling line. For example, in some implementations, it may be desirable to wait until the PCA enabled source sees the HPD signaling pin (e.g., pin 19) asserted thereby indicating to the PCA enabled source that it is now coupled to a sink prior to implementation of a reduced voltage on the +5V signaling line (e.g., 3.3V). The HPD signaling may be transmitted from the cable assembly towards the source. The transmission of this HPD signaling may be delayed a predetermined (or arbitrary) amount of time (e.g., a debounce period) before a sink generates the HPD signal that is subsequently forwarded onto the source. In some implementations, the sink may remove the HPD signaling in response to the reduced voltage PCA advertisement. Accordingly, the PCA enabled source may choose to ignore the de-assertion of the HPD signaling pin. In some implementations, the PCA enabled source may filter the de-assertion of the HPD signaling from the sink and instead place itself into a state whereby it waits for the re-assertion of the HPD signaling so as to, inter alia, distinguish the re-assertion from a new connection as but one example. In such a scenario, the PCA enabled source may implement a timeout (e.g., for a period of ten seconds) prior to determining that the sink was unplugged from the cable assembly.

After receipt of the HPD signaling, the PCA enabled source may set a reduced voltage on the +5V signaling line (e.g., 3.3V) for a defined period of time (e.g., 500 msec). After this defined period of time, the PCA enabled source may then increase this voltage to +5V. If an active cable assembly sees this reduced voltage on the signaling line (e.g., for the defined period of time) it may then recognize the source as a PCA enabled source at operation 304 and therefore may increase its current draw in order to, for example, power its internal active logic at operation 306. The active cable assembly may decide to increase its current draw during the reduced voltage period, or may wait until the voltage has been increased to +5V from the reduced voltage level. However, if the active cable assembly doesn't see this reduced voltage on the power supply pin at operation 304, the active cable assembly may limit its current draw (e.g., to 55 mA) so as to comply with legacy aspects of the HDMI standard at operation 308. Additionally, connected sink devices may typically not operate until +5V voltage is applied to the power supply pin and hence operation of the sink device may be delayed during this defined period of time (e.g., 500 msec). See also discussion of Example Operation No. 1 described supra.

Example Operation No. 3

Upon connection of a cable assembly to a source device at operation 302, a PCA enabled source may signal its ability to provide increased current to an active cable assembly through the assertion of signals on other ones of the signaling pins. For example, the PCA enabled source may generate a common mode signal on one or more of the main link signaling lines (e.g., on at least a portion of pins one through nine). In some implementations, the PCA enabled source may wait until it receives HPD signaling from a sink that indicates to the PCA enabled source that a sink is coupled to the cable assembly, prior to the generation of the common mode signal. Upon receipt of the generated common mode signal, the active cable assembly may detect it is connected with a PCA enabled source at operation 304, the active cable assembly may then draw additional current from the PCA enabled source in order to power its internal logic at operation 306. The active cable assembly may draw the additional current immediately upon detection of the generated common mode signal or may wait for a predefined period of time (e.g., 500 msec) prior to drawing this additional current. However, if the active cable assembly doesn't see this generated common mode signal at operation 304, the active cable assembly may limit its current draw (e.g., to 5 mA) so as to comply with legacy aspects of the HDMI standard at operation 308. In yet another implementation, the PCA enabled source may signal its ability to provide additional current through, for example, altering voltage levels on other ones of the HDMI pins. For example, the voltage on the DDC signaling pins (e.g., one or both of pins fifteen and sixteen) may be altered, thereby indicating to the active cable assembly that the source is a PCA enabled source. These and other variants would be readily apparent to one of ordinary skill given the contents of the present disclosure.

Example Operation No. 4

In some implementations, the PCA enabled source may attempt to perform a write operation on the DDC connection that runs through the cable. However, while these write operations are typically addressed to the connected sink device, this write operation may instead be addressed to a DDC address associated with the cable assembly. This write operation may advertise PCA support by, for example, the PCA enabled source upon, or after, a connection of the cable to the source device at operation 302. The active cable assembly may receive the DDC write operation through the multi-drop DDC connection and may determine whether or not the source is a PCA enabled source at operation 304. Upon determination that the source is a PCA enabled source, the active cable assembly may draw additional current (e.g., 300 mA or more) from the +5V signaling line at operation 306. Conversely, if the active cable assembly does not determine that the source is a PCA enabled source, the active cable assembly may limit its current draw (e.g., to 5 mA) at operation 308.

Example Operation No. 5

Figure 4:
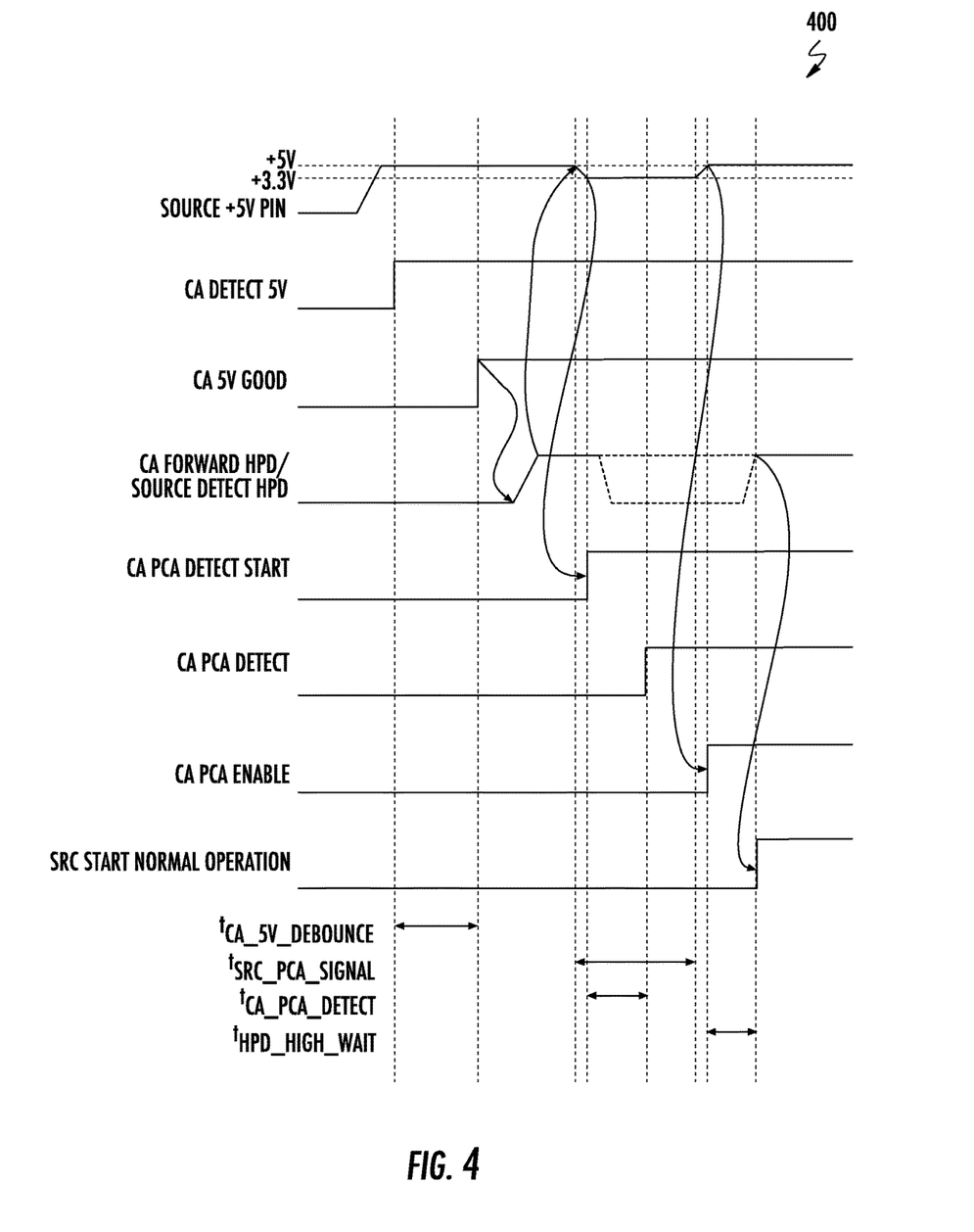
FIG. 4 is an exemplary timing diagram for a PCA capable system in accordance with the principles of the present disclosure.
Figure 5:
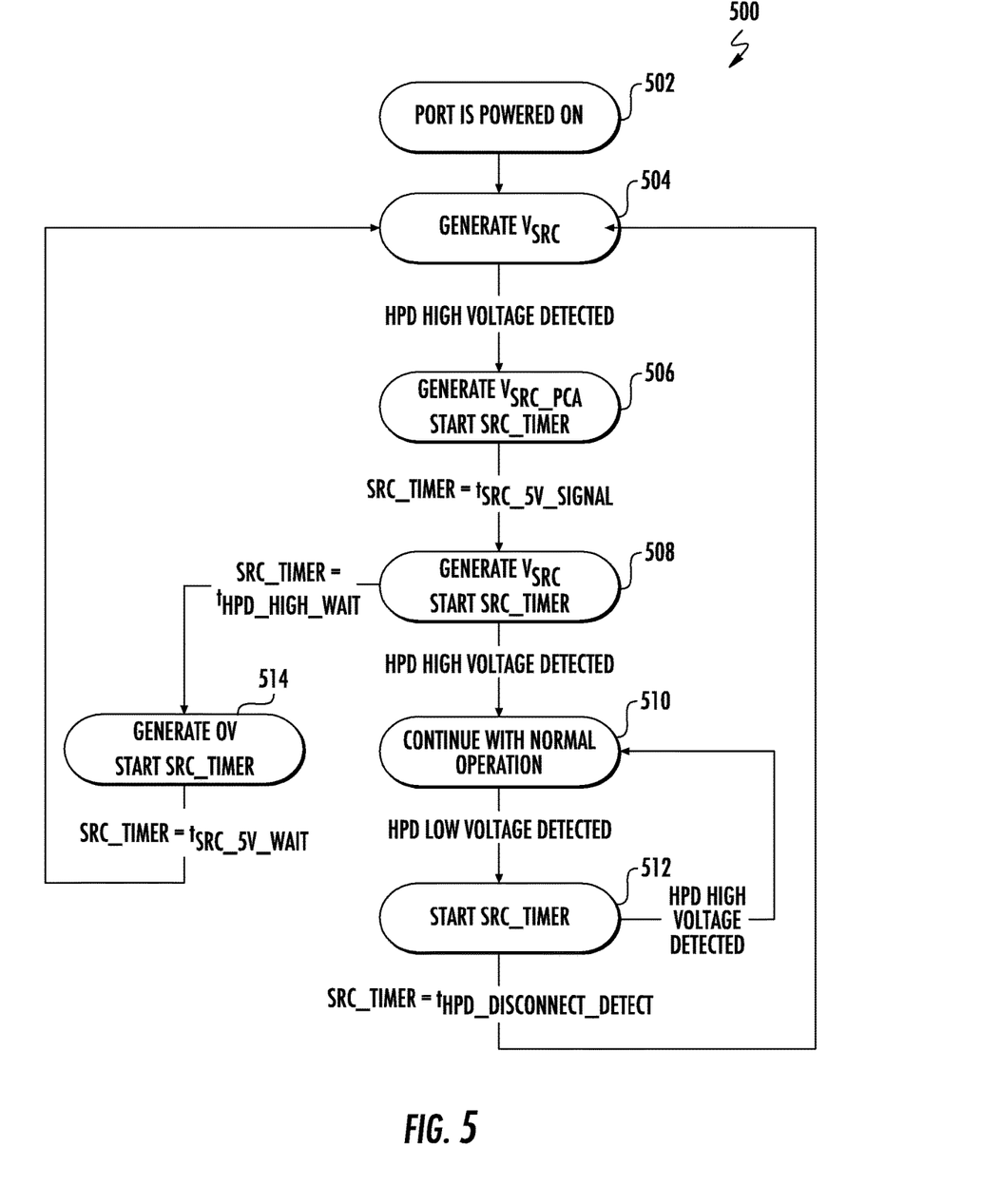
FIG. 5 is an exemplary state machine for a PCA enabled source device in accordance with the principles of the present disclosure.

Referring now to FIGS. 4-6, yet another example operation for the detection and modification of the current draw from a source device 202 by a PCA cable assembly 204 is shown and described in detail. In particular, FIG. 4 illustrates an exemplary timing diagram 400 for the detection and modification of the current draw from the source device by the PCA cable assembly; FIG. 5 illustrates the PCA source state machine 500 during the detection and modification of the current draw from the source device by the PCA cable assembly; and FIG. 6 illustrates the PCA cable assembly state machine 600 during the detection and modification of the current draw from the source device by the PCA cable assembly. Exemplary values for various parameters contained within FIGS. 4-6 may be as indicated by Table 1 and Table 2 reproduced below.

TABLE 1

| Item | Min | Max |
|---|---|---|
| TP1 voltage ($V_{SRC}$) | 4.8 Volts | 5.3 Volts |
| TP1 low voltage ($V_{SRC\_0V}$) | 0 Volts | 0.4 Volts |
| Cable assembly low voltage detect ($V_{CA\_0V}$) | 0 Volts | 0.8 Volts |
| TP2 voltage ($V_{SNK}$) | 4.7 Volts | 5.3 Volts |
| TP1 PCA advertisement voltage ($V_{SRC\_PCA}$) | 3.0 Volts | 3.6 Volts |
| PCA advertisement lower threshold | 2.0 Volts | 2.6 Volts |
| PCA advertisement upper threshold | 4.0 Volts | 4.4 Volts |
| TP1 available current from a non PCA Enabled Source ($I_{SRC}$) | 55 mA | |
| TP1 available current from a PCA Enabled Source ($I_{SRC\_PCA}$) | 300 mA | |
| TP2 current consumed by a Sink ($I_{SNK}$) | | 50 mA |
| TP2 current consumed by a Sink when the Sink is on ($I_{SNK\_ON}$) | | 10 mA |

TABLE 2

| Item | Min | Nominal | Max | Unit | Description |
|---|---|---|---|---|---|
| $t_{SRC\_5V\_Wait}$ | 450 | 500 | 550 | msec | Time for source to wait after taking the +5 V Power pin to 0 V when it has failed to detect HPD after transmitting its PCA capability advertisement before generating $V_{SRC}$ again |
| $t_{SRC\_PCA\_Signal}$ | 135 | 150 | 165 | msec | Duration of source's PCA capability advertisement |
| $t_{SRC\_PCA\_Signal\_RF}$ | | | 50 | msec | 10%-90% rise/fall time for the transitions between $V_{SRC}$ and $V_{SRC\_PCA}$ at the start and end of the PCA capability advertisement[1] Note 1: Source may take into account the load capacitance from the cable assembly in meeting the rise/fall time requirement |
| $t_{CA\_5V\_Debounce}$ | 100 | 110 | 120 | msec | Time for cable assembly to wait for +5 V Power pin to debounce before enabling HPD forwarding from sink to source and testing for the source's PCA capability advertisement |
| $t_{CA\_PCA\_Detect}$ | 45 | 50 | 55 | msec | Time for cable assembly to test that the +5 V Power pin voltage is maintained at $V_{SRC\_PCA}$ in order to qualify source's PCA capability assessment |
| $t_{HPD\_high\_Wait}$ | | 5 | | s | Time for source to wait for HPD to be detected at a high level after generating PCA capability advertisement |
| $t_{HPD\_disconnect\_detect}$ | 180 | 200 | 220 | msec | Time for source to detect disconnection of a sink by detecting HPD at the low voltage level for this duration |
| $t_{SRC\_force\_disconnect}$ | | 1 | | s | Duration for a source to apply $V_{SRC\_0V}$ on its +5 V Power pin in order to force a disconnect prior to changing between a PCA enabled source and a PCA disabled source |

The timing diagram illustrated in FIG. 4 identifies the various timeouts, delays, and dependencies for implementing the PCA capability for the embodiment described with reference to Example Operation No. 5. For example, all the dependencies illustrated in FIG. 4 may be dependent upon voltage level detection. In some implementations, voltage transitions (i.e., transitions between voltage levels) may not be detected, while absolute voltage levels are detected. The timing diagram 400 starts by the PCA enabled source 202 generating a voltage on the +5V power pin of approximately, for example, 5V (e.g., the voltage as indicated by $V_{SRC}$ in Table 1 reproduced supra). The use of the word "approximately" in this context refers to the fact that a tolerance level has been established for the voltage $V_{SRC}$ on the +5V power pin (e.g., between 4.8V and 5.3V as but one non-limiting example). Subsequent to the generation of the voltage on the +5V power pin, the PCA cable assembly 204 detects this generated voltage and waits a predetermined amount of time in order to acknowledge this detection as "good". In some implementations, the predetermined amount of time may be indicated by the debounce period $t_{CA\_5V\_Debounce}$ as indicated in Table 2 reproduced supra. As a brief aside, the term "bounce" as utilized in this context refers to the tendency of an electronic device (e.g., the PCA capable source 202) to generate multiple signals as a voltage signal is turned on or turned off. For example, when a physical connection is being made between, for example, a source and a cable assembly, the physical contacts in the connector may repeatedly be made and broken during plug insertion. Accordingly, the reception of the electrical signal is thus unreliable during the period of time that this phenomenon is occurring. As but yet another example, the contacts in the plug and receptacle may "scrape" as the contacts in the plug and receptacle slide over each other as the plug is physically being inserted. Either (or both) of these scenarios may result in a "bounce" condition. After a predetermined period of time, the multiple signals generated may resolve into a single signal. Accordingly, this de-bounce period may ensure that only a single signal will be acted upon for a single turning on or single turning off event.

Subsequent to this debounce period, the PCA cable assembly 204 will forward an HPD signal from the sink device 206 towards the source device 202 and the PCA enabled source 202 may detect the forwarding of this HPD signal. In some implementations, the PCA enabled source 202 may wait a predetermined amount of time before reverting back to a voltage of zero (e.g., $V_{SRC\_0V}$ as indicated in Table 1). This predetermined amount of time may be denoted by $t_{SRC\_5V\_Wait}$ as indicated in Table 2. Should the HPD signal be detected, and subsequent to this detection of the HPD signal at the PCA enabled source 202, the PCA enabled source 202 may reduce the voltage of the +5V pin down for a predetermined amount of time to a level where the PCA cable assembly 204 is able to detect that it is connected with a PCA enabled source 202. For example, the voltage in this period may be reduced to a value of $V_{SRC\_PCA}$ or approximately 3.3V for a time $t_{SRC\_PCA\_SIGNAL}$. The values $V_{SRC\_PCA}$ and $t_{SRC\_PCA\_SIGNAL}$ may be as indicated in Tables 1 and 2, respectively, as reproduced supra. The use of the word "approximately" in this context refers to the fact that a tolerance level has been established for the voltage value $V_{SRC\_PCA}$ on the +5V power pin (e.g., between 3.0V and 3.6V). In some implementations, this change in voltage level may be characterized by a rise/fall time with the duration of this rise/fall time being indicated by parameter $t_{SRC\_PCA\_Signal\_RF}$ as indicated in Table 2. Additionally, the load current during the assertion of $V_{SRC\_PCA}$ may be established between 0 mA and 55 mA as indicated by Table 1. This reduction in voltage may be utilized to "advertise" the PCA functionality of the PCA enabled source 202.

The PCA cable assembly 204 may then detect this reduction in voltage which advertises to the PCA cable assembly 204 that it may draw extra current in order to power its internal logic from the PCA enabled source 202. For example, prior to advertisement of the PCA low voltage signal, the available current from a source 202 may be established by $I_{SRC}$ in Table 1. However, subsequent to the advertisement of the PCA low voltage signal, the available current from the source 202 may be established by $I_{SRC\_PCA}$ in Table 1. In some implementations, the timing for this detection may be indicated as $t_{CA\_PCA\_detect}$ as contained within Table 2 reproduced supra. Additionally, this reduced voltage level by the PCA enabled source 202 may be applied by the PCA enabled source 202 for a time period $t_{SRC\_PCA\_Signal}$ as indicated in Table 2 reproduced supra in some implementations. Subsequent to the time period $t_{SRC\_PCA\_Signal}$ expiring, the PCA functionality may be enabled upon resumption of operation of the +5V pin to a value of $V_{SRC}$ as indicated in Table 1 reproduced supra. In some implementations, the PCA enabled source 202 may wait a predetermined amount of time before resuming normal operation (e.g., prior to performing an EDID read, starting its high speed signaling, etc.). For example, this predetermined amount of time before resuming normal operation may be indicated by $t_{HPD\_high\_wait}$ as indicated in Table 2.

During this predetermined amount of time (e.g., $t_{HPD\_high\_Wait}$) before resuming normal operation, the PCA enabled source 202 may determine whether or not the HPD signal resides at, for example, a high voltage level. If, for example, the HPD signal is not at a high voltage level within this predetermined amount of time before resuming normal operation, the PCA enabled source 202 may remove the voltage on the +5V power pin and then may subsequently restart the PCA timing diagram 400 process. If, however, the PCA enabled source 202 starts its normal operation, it may continue to do so until it observes (detects) that the physical HPD pin from the sink device 206 is at a low voltage level. In some implementations, the amount of time for the PCA enabled source 202 to detect the disconnection of the sink 206 of the HPD pin at a low voltage level may be indicated by $t_{HPD\_disconnect\_detect}$ as reproduced in Table 2 supra. Additionally, in some circumstances, the source 202 may apply a voltage of $V_{SRC\_0V}$ on its +5V power pin in order to force a disconnect prior to changing its operating paradigm between a PCA enabled source and a PCA disabled source (or from a PCA disabled source to a PCA enabled source). The duration of time for this change in operating paradigm may be indicated by $t_{SRC\_force\_disconnect}$ as indicated in Table 2.

Referring now to FIG. 5, an exemplary PCA source state machine 500 is illustrated which may be utilized in accordance with the timing diagram 400 as discussed with respect to FIG. 4. In state 502, the PCA enabled source 202 powers on its port. In state 504, the PCA enabled source 202 generates a voltage $V_{SRC}$. The value of the voltage $V_{SRC}$ may be as indicated in Table 1. The PCA enabled source 202 may then wait until a high voltage level for the HPD signaling is detected. In state 506, the PCA enabled source 202 may generate a voltage $V_{SRC\_PCA}$ and start the SRC timer. In some implementations, the SRC timer may be as indicated by $t_{SRC\_5V\_Signal}$ while in state 506.

In state 508, the PCA enabled source 202 generates a voltage $V_{SRC}$ and starts another instance of the SRC timer. In some implementations, this SRC timer may be as indicated by $t_{HPD\_high\_Wait}$. If no high voltage HPD signal is detected, the state machine advances to state 514 where the PCA enabled source generates a low voltage $V_{SRC\_0V}$ and starts another instance of the SRC timer. In some implementations, this SRC timer may be indicated by $t_{SRC\_5V\_Wait}$. If, however, a high voltage HPD signal is detected, the state machine advances to state 510 where the PCA enabled source 202 continues on with normal operations. Upon detection of a low voltage HPD signal, the PCA enabled source 202 may advance to state 512 where another instance of the SRC timer is started. In some implementations, this SRC timer may be indicated by $t_{HPD\_disconnect\_detect}$. If a high voltage HPD signal is detected within the timing constraint of SRC timer, the state reverts back to state 510, otherwise the PCA enabled source 202 may advance to state 504. While the aforementioned discussion is described in the context of a single SRC timer, it would be readily apparent to one of ordinary skill given the contents of the present disclosure, that multiple timers and even separate timers may be utilized by the PCA enabled source for performing each of these corresponding time measurement functions in some implementations.

Referring now to FIG. 6, an exemplary PCA cable assembly state machine 600 during the detection and modification of the current draw from the source device by the PCA cable assembly is illustrated; which may be utilized in accordance with the timing diagram 400 as discussed with respect to FIG. 4. In state 602, the PCA cable assembly 204 may be powered while the HPD signaling to the source 202 is disabled. Upon detection of the voltage $V_{SRC}$ asserted by the source 202, the PCA cable assembly 204 may start the CA_timer. The duration of this timer may be set to $t_{CA\_5V\_Debounce}$ in some implementations. If the PCA cable assembly 204 fails to detect $V_{SRC}$ over the +5V pin during execution of the CA_timer, the state machine may revert back to state 602. Upon expiration of CA_timer, all while the +5V pin is set at $V_{SRC}$, the PCA cable assembly may enable HPD forwarding from the sink 206 to the source 202 and may operate with self-power, if available, in state 606.

As a brief aside, detection of, for example, voltage $V_{SRC}$, $V_{SRC\_CA}$, and $V_{SRC\_OV}$ as set forth in Table 1 may be detected by the PCA cable assembly 204 via the use of comparator circuitry in some implementations. For example, two comparators may be used and one comparator may be used for distinguishing between $V_{SRC}$ and $V_{SRC\_CA}$ and another comparator may be used for distinguishing between $V_{SRC\_CA}$ and $V_{SRC\_OV}$. Accordingly, a voltage that falls between the thresholds of the two comparators may be interpreted as $V_{SRC\_CA}$. Example values for the comparator thresholds may be as set forth in Table 1. A cable assembly 204 utilizing such a comparator implementation may be considered compliant despite the fact that the cable assembly does not necessarily detect the precise voltage ranges for $V_{SRC}$, $V_{SRC\_CA}$, and $V_{SRC\_OV}$.

If the PCA cable assembly 204 detects a voltage on the +5V pin of $V_{CA\_OV}$, the state machine may revert to state 602. Otherwise, the PCA cable assembly 204 may wait until it detects $V_{SRC\_PCA}$. Upon detection of $V_{SRC\_PCA}$, the PCA cable assembly 204 may advance to state 608 where another instance of the CA_timer is started. In some implementations, this CA_timer is set to $t_{CA\_PCA\_Detect}$. If $\setminus I_{SRC\_PCA}$ is not detected by the PCA cable assembly 204 during execution of CA_timer, the PCA cable assembly 204 may revert back to state 606. However, if $V_{SRC\_PCA}$ is detected upon expiration of the CA_timer, the PCA cable assembly 204 advances to state 610 where it is determined that the source 202 is a PCA enabled source. While described in the context of a single CA_timer, it would be apparent to one of ordinary skill, given the contents of the present disclosure, that multiple timers and even separate timers may be utilized by the cable assembly for performing each of these corresponding time measurements in some implementations. If the PCA cable assembly detects $V_{CA\_OV}$ on the +5V pin while in state 610, the PCA cable assembly 204 will revert back to state 602. However, while in state 610, the PCA cable assembly 204 detects a voltage of $V_{SRC}$ on the +5V pin, the PCA cable assembly 204 will advance to state 612 where the PCA cable assembly 204 will operate with the source PCA power and/or operate under self-power. Upon detection of a voltage $V_{CA\_OV}$ on the +5V pin, the PCA cable assembly 204 will revert back to state 602.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for detecting a Power for Cable Assembly (PCA)-capable source, the PCA-capable source being coupled to a sink device through a cable assembly, the method comprising:
    detecting, by the cable assembly, an assertion of a defined voltage on a power supply pin;
    forwarding an assertion of a hot plug detect signal pin, by the cable assembly, from the sink device towards the PCA-capable source;
    detecting, by the cable assembly, a reduction in the defined voltage on the power supply pin for a defined period of time in response to the forwarding; and
    detecting, by the cable assembly, a re-assertion of the defined voltage on the power supply pin subsequent to the lapse of the defined period of time.

2. The method of claim 1, wherein the forwarding of the assertion of the hot plug detect signal pin is in response to the detecting, by the cable assembly, of the assertion of the defined voltage on the power supply pin.

3. The method of claim 2, further comprising increasing a current draw, by the cable assembly, from the PCA-capable source subsequent to the detecting, by the cable assembly, of the re-assertion of the defined voltage on the power supply pin.

4. The method of claim 3, further comprising utilizing an output of a comparator for the detecting, by the cable assembly, of the reduction in the defined voltage on the power supply pin.

5. The method of claim 4, further comprising using a timer in order to evaluate the defined period of time in response to the forwarding.

6. A Power for Cable Assembly (PCA) dependent cable assembly, comprising:
    a first network interface that is configured to be coupled with a source device;

a second network interface that is configured to be coupled with a sink device; and internal logic that is configured to enable the PCA dependent cable assembly to:
- detect an assertion of a defined voltage on a power supply pin associated with the first network interface;
- forward an assertion of a hot plug detect signal pin received by the second network interface over the first network interface towards the source device;
- detect a reduction in the defined voltage on the power supply pin associated with the first network interface for a defined period of time in response to the forward of the assertion of the hot plug detect signal; and
- detect a re-assertion of the defined voltage on the power supply pin associated with the first network interface, subsequent to the lapse of the defined period of time.

7. The PCA dependent cable assembly of claim 6, wherein the internal logic further comprises one or more integrated circuits, the one or more integrated circuits further configured to enable a signal conditioning function for data transmitted over the first network interface.

8. The PCA dependent cable assembly of claim 6, wherein the internal logic further comprises one or more integrated circuits, the one or more integrated circuits further configured to enable a repeater function for data transmitted over the first network interface.

9. The PCA dependent cable assembly of claim 6 further comprising self-powering circuitry, the self-powering circuitry enabling power of the internal logic by apparatus other than the power supply pin associated with the first network interface.

10. The PCA dependent cable assembly of claim 6, wherein the internal logic configured to forward the assertion of the hot plug detect signal pin is further configured to forward the assertion of the hot plug detect signal pin in response to the detection of the assertion of the defined voltage on the power supply pin.

11. The PCA dependent cable assembly of claim 10, wherein the internal logic is further configured to increase a current draw from the source device subsequent to the detection of the re-assertion of the defined voltage on the power supply pin associated with the first network interface.

12. The PCA dependent cable assembly of claim 11, wherein the internal logic further comprises a comparator, and other portions of the internal logic are configured to utilize an output of the comparator for the detection of the reduction in the defined voltage on the power supply pin associated with the first network interface.

13. The PCA dependent cable assembly of claim 12, wherein the internal logic further comprises a timer, the timer being utilized in order to evaluate the defined period of time.

14. A Power for Cable Assembly (PCA) capable source device, comprising:
- a network interface, the network interface comprising a plurality of data transmission lanes, a hot plug detect signaling pin, and a power supply pin;
- a processor apparatus; and
- a non-transitory computer readable apparatus, the non-transitory computer readable apparatus comprising a storage medium, the storage medium having a plurality of computer-executable instructions, the plurality of computer-executable instructions, when executed by the processor apparatus, are configured to:
  - assert a defined voltage on the power supply pin;
  - receive an assertion of a hot plug detect signal via the hot plug detect signaling pin;
  - assert a reduced voltage on the power supply pin, the reduced voltage being less than the defined voltage, the reduced voltage being asserted for a defined period of time in response to the received hot plug detect signal; and
  - re-assert the defined voltage on the power supply pin subsequent to the lapse of the defined period of time.

15. The PCA capable source device of claim 14, wherein the PCA capable source device is configured to operate according to two operating paradigms, the two operating paradigms comprising a PCA enabled source operating paradigm and a PCA disabled source operating paradigm.

16. The PCA capable source device of claim 15, wherein the assertion of the reduced voltage on the power supply pin is indicative of the PCA enabled source operating paradigm.

17. The PCA capable source device of claim 16, wherein the assertion of the defined voltage on the power supply pin is indicative of either the PCA enabled source operating paradigm or the PCA disabled source operating paradigm.

18. The PCA capable source device of claim 15, wherein the plurality of computer-executable instructions, when executed by the processor apparatus, are further configured to:
- enable an increased current draw over the power supply pin when in the PCA enabled source operating paradigm, the increased current draw being enabled without triggering a fuse present on the PCA capable source device, the increased current draw being higher in current than a current draw when the PCA capable source device is operating in accordance with the PCA disabled source operating paradigm.

19. The PCA capable source device of claim 14 wherein the received assertion of the hot plug detect signal is received in response to the assertion of the defined voltage on the power supply pin.

20. The PCA capable source device of claim 19, further comprising a timer, the timer configured to establish the defined period of time.

* * * * *